Sept. 23, 1969 V. W. REIMER 3,468,109

PICK-UP FINGER AND REEL BATT CONSTRUCTION

Filed June 8, 1966 2 Sheets-Sheet 1

INVENTOR
VICTOR W. REIMER
BY
Merchant & Gould
ATTORNEYS

PICK-UP FINGER AND REEL BATT CONSTRUCTION

Filed June 8, 1966 2 Sheets-Sheet 2

INVENTOR
VICTOR W. REIMER
BY
Merchant & Gould
ATTORNEYS

United States Patent Office 3,468,109
Patented Sept. 23, 1969

3,468,109

PICK-UP FINGER AND REEL BATT CONSTRUCTION

Victor W. Reimer, Winnipeg, Manitoba, Canada, assignor to Kilbery Industries, Ltd., Winnipeg, Manitoba, Canada, a corporation of Canada Filed June 8, 1966, Ser. No. 556,034
Int. Cl. A01d 57/00, 77/00, 19/00
U.S. Cl. 56—220 3 Claims

ABSTRACT OF THE DISCLOSURE

An elongated, cross sectionally U-shaped bar defining a channel, and a plurality of fingers projecting transversely from said channel, the fingers of each pair having heads received in the channel, the heads of each pair being connected by a resilient arm. Detent means operatively associated with said bar and with each pair of connected fingers provides for releasably locking each pair of fingers in the channel independently of the other of said pairs of fingers.

This invention relates generally to pick-up reels for agricultural implements and more particularly to improvements in reel batt and pick-up finger construction for such reels.

Generally, the present invention comprises a novel reel batt or finger bar for pick-up reels, and cooperating replaceable pick-up fingers arranged in pairs, the fingers of each pair having mounting head portions at their inner ends and a resilient arm connecting the mounting head portions, the finger bar or reel batt defining a channel for the inner end portions of the pick-up fingers, the pick-up finger pairs and the finger bar having cooperating detents and transverse recesses for releasably locking the pick-up fingers in said channel.

An important object of this invention is the provision of a finger bar and pick-up finger assembly in which the pick-up fingers can be quickly and easily mounted to the finger bar and as quickly and easily removed for replacement.

Another object of this invention is the provision of a finger bar and pick-up finger assembly which dispenses with the necessity for screws or studs and nuts for rigidly holding the pick-up fingers in place.

Another object of this invention is the provision of a finger bar and pick-up finger assembly having smooth surfaces which effectively prevent crops from becoming entangled thereon and adhering thereto during operation of the assembly in the field.

Another object of this invention is the provision of a pick-up finger which can be molded of plastic material at low cost.

Yet another object of this invention is the provision of a finger bar and pick-up finger assembly which is light in weight and which possesses substantial strength.

The above, and further highly important objects and advantages of this invention will become apparent from the following detailed specification, appended claims and attached drawings.

Referring to the drawings, which illustrate the invention, and in which like reference characters indicate like parts throughout the several views.

Figures 1, 2, 3:
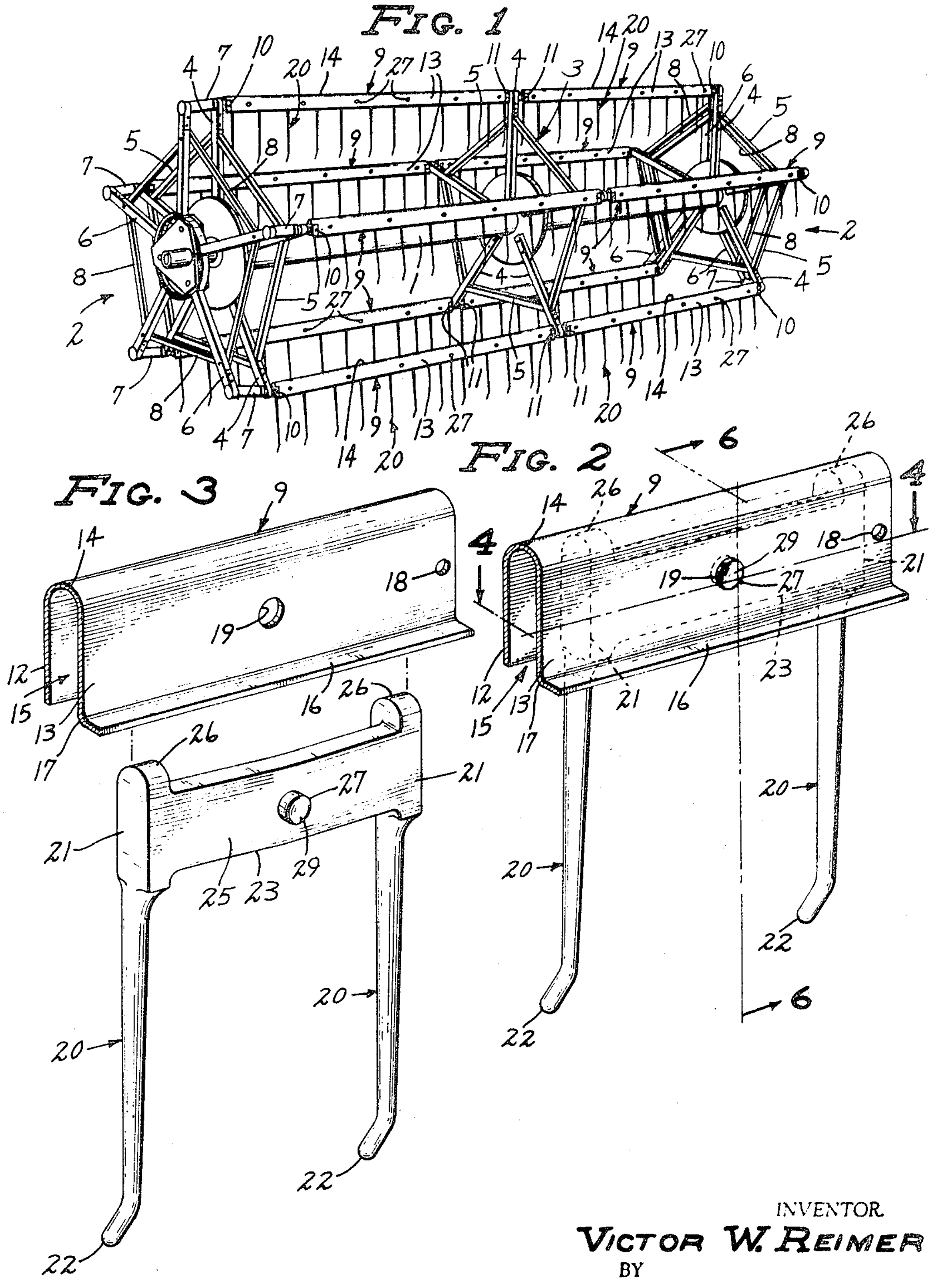
FIG. 1 is a view in perspective of an agricultural implement pick-up reel utilizing the reel batt or finger bar and pick-up finger assembly of this invention.
FIG. 2 is an enlarged fragmentary view in perspective of a finger bar and pick-up finger mounted therein.
FIG. 3 is a view corresponding substantially to FIG. 2 but showing the pick-up fingers released from the finger bar.

Referring with greater detail to the drawings, and more particularly to FIG. 1, a conventional reel for agricultural implements is shown as comprising an axial shaft 1, transverse end frames 2 and an intermediate transverse frame 3. The frames 2 and 3 each include a plurality of circumferentially spaced radial arms 4 and generally circumferentially extending brace bars 5, the end frames 2 further including generally radially outwardly extending control rods 6, pivotally secured at their outer ends to connecting links 7, and connected by generally circumferentially extending brace bars or rods 8. The links 7 are pivotally connected to the outer ends of the radial arms 4 of the end frames 2 and to axially extending reel batts or finger bars, indicated generally at 9, the control rods 6 cooperating with other mechanism to keep the batts or finger bars 9 disposed in a generally vertical plane during rotation of the reel. With the exception of the detailed construction of the batts or finger bars 9, the reel illustrated in FIG. 1 is of conventional and well known construction in and of itself not comprising the instant invention. Hence, further detailed showing and description thereof is omitted in the interest of brevity.

Figures 6, 7:
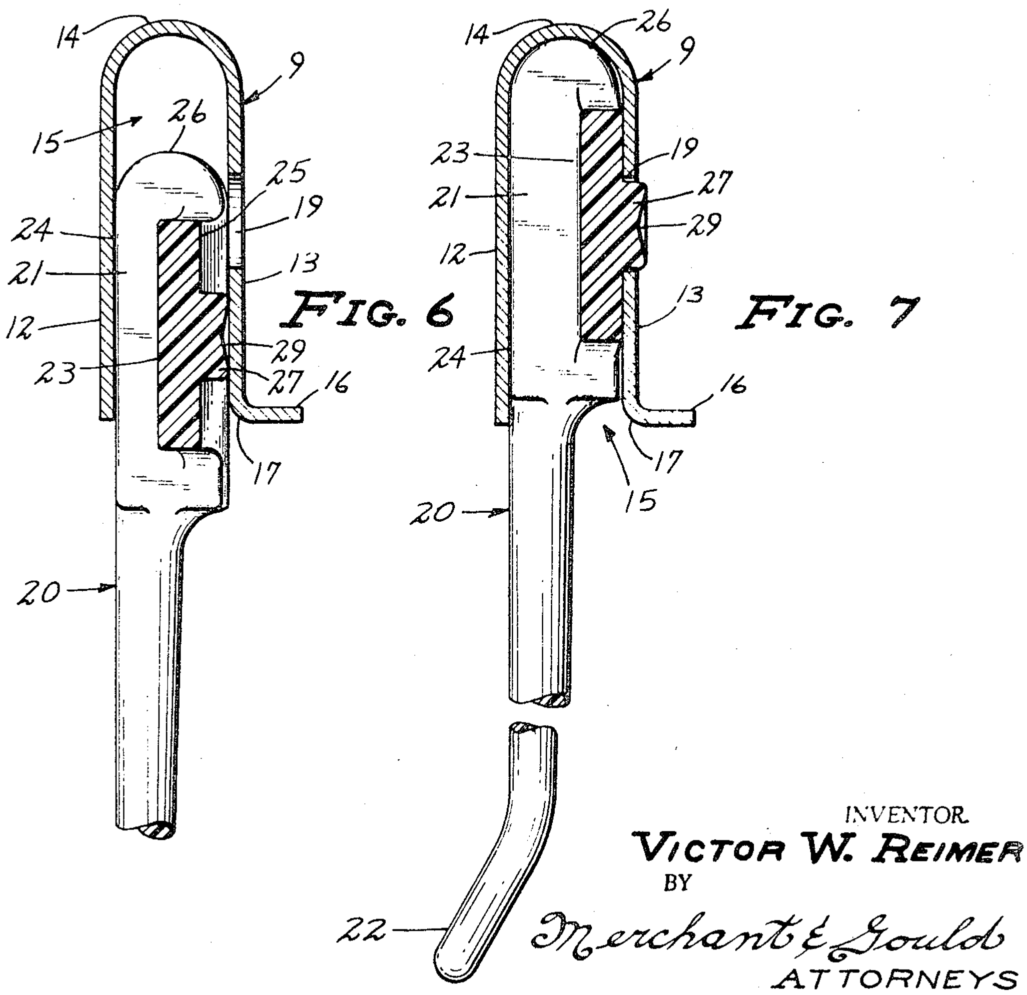
FIG. 6 is a transverse section taken on the line 6—6 of FIG. 2 but showing the parts in partially disassembled relationship as in FIG. 4.
FIG. 7 is a view corresponding to FIG. 6 but showing the parts in completely assembled relationship, as in FIGS. 2 and 5.

As shown, the several axially extending reel batts or finger bars 9 are connected at their outer ends to the radial arms 4 of the end frames 2, as indicated at 10, for common movements with their respective connecting links 7. At their inner ends, the finger bars 9 are pivotally connected to the outer ends of adjacent radial arms 4 of the intermediate frame 3, as indicated at 11. Each finger bar 9 is formed from sheet metal or the like to an inverted generally U-shape to provide opposed side or front and rear walls 12 and 13 respectively, relative to the direction of rotation of the lower crop-engaging portion of the reel, and an arcuate connecting portion 14 whereby to define a laterally outwardly or downwardly opening channel 15. The lower edge portion of the rear wall 13 is bent outwardly to provide a longitudinally extending flange 16 which projects generally rearwardly relative to the direction of rotation of the lower crop-engaging portion of the reel. As shown particularly in FIGS. 6 and 7, the rear walls 13 and their cooperating flanges 16 cooperate to define curved surface portions 17 for facilitating application of the pick-up fingers to the finger bars 9, as will presently be described. At their opposite ends, the finger bars 9 are provided with transverse apertures 18, one of which is shown in FIGS. 2 and 3, for mounting the finger bars to the pivotal connections 10 in a conventional manner. Further, each finger bar 9 is provided with a plurality of longitudinally spaced transverse apertures 19 through the rear wall 13 thereof, the purpose of which will hereinafter become apparent.

The pick-up fingers of the present invention are indicated generally by the numeral 20 and are arranged in pairs, each finger 20 having an enlarged upper end portion 21 from which the finger 20 tapers downwardly to a diametrically reduced lower or outer end portion 22 that is angularly displaced preferably forwardly in the direction of crop-engaging movement of the pick-up finger. The upper end portions 21 of the fingers 20 of each pair thereof are connected by a cross arm portion 23 that is normally slightly bowed in a direction generally rearwardly relative to the forward angular displacement of the outer ends 22 of the fingers 20, as shown in FIG. 3. Preferably, the normal distance between the front surfaces 24 of the upper end portions 21 and the rear surface 25 of the arm portion 23 at its most outwardly bowed central portion intermediate the fingers 20 is generally equal to or slightly greater than the distance between the front and rear walls 12 and 13 respectively of the respective finger bar 9. As shown, the extreme upper or inner ends of the portions 21 are rounded, as indicated at 26 for ease in inserting the pick-up finger pairs into the channels 15. The pick-up finger pairs 20, together with their respective connecting arms 23 are made from resilient synthetic plastic material, such as nylon, molded as an integral unit.

Each cooperating pair of pick-up fingers 20 is provided with an anchoring detent or boss 27 that projects rearwardly from the rear surface 25 of the resilient connecting arm 23 generally centrally between the upper end or mounting head portions of the fingers 20, each detent or boss 27 being adapted to be received in a cooperating one of the recesses or apertures 19 in the finger bars 9.

Figures 4, 5:
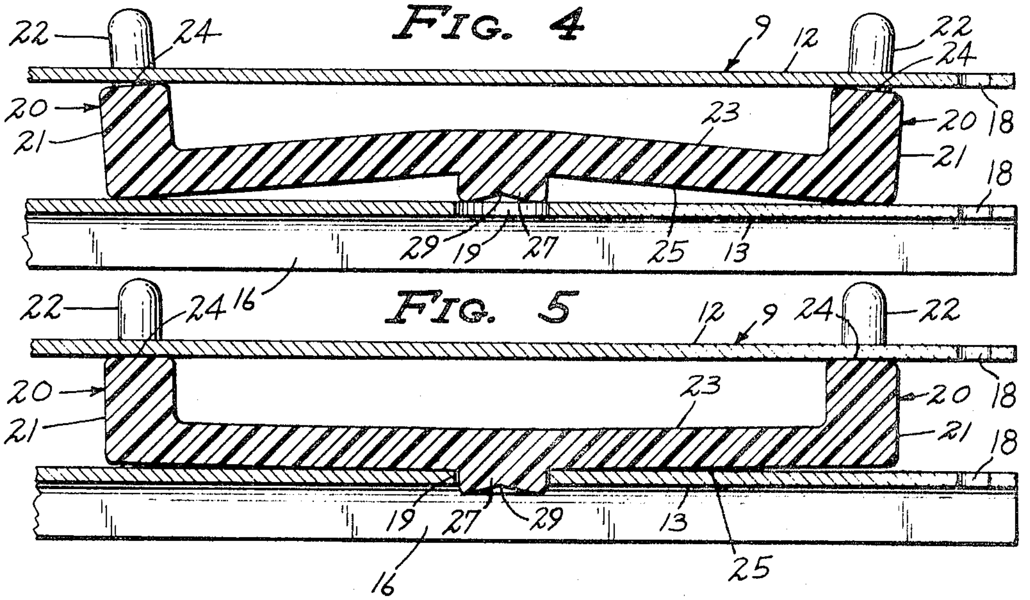
FIG. 4 is an enlarged transverse section taken substantially on the line 4—4 of FIG. 2 but showing the parts in partially disassembled relationship.
FIG. 5 is a view corresponding to FIG. 4 but showing the parts completely assembled, as in FIG. 2.

When it is desired to mount a given pair of pick-up fingers 20 to a given finger bar 9, the rounded ends 26 of the mounting heads 21 are moved upwardly into the channel 15, and forward pressure is applied to the rear wall surface 25 of the resilient connecting arm portion 23 to re-curve the arm portion 23 in a forward direction, as shown in FIG. 4, thus permitting the boss or detent 27 to enter the channel 15, entry of the boss 27 being facilitated by the curved portion 17 in the rear wall 13. When the mounting head portions 21 are completely received in the channel 15, the boss 27 comes into register with its respective recess or aperture 19, and is pressed thereinto by the bias exerted in the recurved connecting arm portion 23 as it endeavors to assure its normally rearwardly bowed condition. The normal dimension of each pick-up finger unit, from the front surfaces 24 thereof to the rearmost portion of the rear surface 25, being the same or slightly greater than the distance between the walls 12 and 13, the pair of pick-up fingers 20 are rigidly and snugly anchored in the channel 15.

It will be noted, with reference to FIGS. 4–7, that the axially outer ends of the detents or bosses 27 are formed to provide axially outwardly opening shallow pockets 29. When it is desired to remove a cooperating pair of fingers 20 from the finger bar 9, for replacement, the bit end of a screw driver or the end of a steel rod may be inserted in the shallow pocket 29 to move the detent 27 forwardly out of its cooperating aperture 19, whereupon the mounted head portions 21 and connecting arm portion 23 may be moved downwardly out of the channel 15. Thereafter, a new pair of pick-up fingers 20 may be applied to the finger bar 9 in the manner above-described, the entire operation being easily accomplished with a minimum loss of time. By making the batts or finger bars 9 from sheet metal and the pick-up fingers from molded plastic material, such as nylon, the entire batt and pick-up finger assembly of a given reel lessens the overall weight of the reel to a considerable extent over that of reels heretofore produced.

What is claimed is:

1. A finger bar and pick-up finger assembly for an agricultural implement reel including an axial shaft and transverse frame means at axially spaced portions of said shaft, said assembly comprising:

(a) an elongated finger bar extending in a direction parallel to the axis of the reel and having means at its opposite ends for attachment to said transverse frame means and having spaced sidewalls defining a laterally outwardly opening channel, (b) a plurality of pick-up fingers disposed in spaced parallel relationship longitudinally of said finger bar and extending transversely thereof, said fingers being arranged in independent pairs of fingers, (c) said pairs of fingers having inner ends providing mounting head portions received in said channel and resilient arms connecting said head portions within said channels, said resilient arms and said one of the sidewalls having detents and cooperating detent receiving recesses for releasably locking each pair of fingers in said channel independently of the other of said pairs thereof and against movement of said pairs of fingers in directions longitudinally and transversely of said finger bar, said arms being generally bowed longitudinally of the finger bar to provide a generally convex side normally engaging said one of the sidewalls, the transverse dimension of the mounting head portions of each pair thereof and their respective arms being normally generally equal to the dimension of said channels between the sidewalls thereof.

2. The assembly defined in claim 1 in which said detents comprise bosses projecting laterally outwardly from said resilient arms generally centrally between the opposite ends of said resilient arms, said recesses comprising apertures extending transversely through said adjacent side wall of the finger bar.

3. The assembly defined in claim 1 in which the fingers of each of said pair thereof and said resilient arm connected thereto comprise an integral unit molded from synthetic plastic material.

References Cited

UNITED STATES PATENTS

| | | | |
|---|---|---|---|
| 1,196,237 | 8/1916 | Holm. | |
| 2,603,936 | 7/1952 | Keene | 56—400 |
| 2,748,556 | 6/1956 | Summers et al. | 56—220 X |
| 3,251,110 | 5/1966 | Heou | 24—230 |

FOREIGN PATENTS

| | | |
|---|---|---|
| 379,808 | 9/1932 | Great Britain. |

ROBERT PESHOCK, Primary Examiner

P. A. RAZZANO, Assistant Examiner

U.S. Cl. X.R.

56—400; 24—230